United States Patent
Segura Moreno et al.

(10) Patent No.: US 8,764,428 B2
(45) Date of Patent: Jul. 1, 2014

(54) DEVICE FOR THE PREPARATION OF PREFORMS OF CARBON FIBER-REINFORCED COMPONENTS

(75) Inventors: Miguel Segura Moreno, Derio (ES); Ricardo Mezzacasa Lasarte, Derio (ES); Francisco José Estensoro Astigarraga, Derio (ES); José Ramón García Martínez, Edificio (ES); Xabier Irastorza Arregui, Derio (ES); Valentin Collado Jiménez, Derio (ES); Oihane Beloki Zubiri, Derio (ES)

(73) Assignee: Fundacion Tecnalia Research & Innovation (ES)

( * ) Notice: Subject to any disclaimer, the term of this patent is extended or adjusted under 35 U.S.C. 154(b) by 161 days.

(21) Appl. No.: 13/445,020

(22) Filed: Apr. 12, 2012

(65) Prior Publication Data
US 2012/0288583 A1 Nov. 15, 2012

(30) Foreign Application Priority Data
Apr. 12, 2011 (EP) .................................... 11382106

(51) Int. Cl.
*B29C 70/44* (2006.01)
*B29C 35/02* (2006.01)

(52) U.S. Cl.
USPC ........................................ 425/174.6; 425/389

(58) Field of Classification Search
USPC ................................ 425/174.6, 389; 264/450
See application file for complete search history.

(56) References Cited

U.S. PATENT DOCUMENTS

| | | | |
|---|---|---|---|
| 2,416,137 A | | 2/1947 | Auxier et al. |
| 3,334,383 A | * | 8/1967 | Irvine .......................... 425/389 |
| 6,045,651 A | * | 4/2000 | Kline et al. .................... 156/285 |
| 6,146,576 A | * | 11/2000 | Blackmore .................... 264/404 |
| 6,312,247 B1 | * | 11/2001 | Kassuelke et al. ............ 425/389 |
| 7,326,044 B2 | * | 2/2008 | Kirchner ........................ 425/389 |
| 2005/0140064 A1 | | 6/2005 | Jorn et al. |
| 2005/0236093 A1 | | 10/2005 | Taggart |
| 2005/0236098 A1 | | 10/2005 | Blackmore |
| 2010/0007065 A1 | | 1/2010 | Reinhold et al. |

FOREIGN PATENT DOCUMENTS

| | | |
|---|---|---|
| EP | 1808282 A1 | 7/2007 |
| JP | 2007118598 A | 5/2007 |
| JP | 2008230020 A | 10/2008 |
| WO | 0192002 A2 | 12/2001 |
| WO | 03078141 A1 | 9/2003 |

OTHER PUBLICATIONS

European Search Report issued Oct. 3, 2011 re: EP 11 38 2106; US 2010/007065 A1 and US 2 416 137 A.

* cited by examiner

*Primary Examiner* — Robert B Davis
(74) *Attorney, Agent, or Firm* — Cantor Colburn LLP

(57) ABSTRACT

Disclosed is a device for preparing preforms of carbon fiber-reinforced components including a preforming mold that can be immobilized on a work bench in an electrically insulated manner, and provided with at least two electrodes in positions in which they contact opposite end areas of the preform to generate a resistive electrical circuit through the carbon fibers to activate a binder present in the preform by heating, a leak-tight elastically deformable compacting membrane capable of adapting to the outer geometry of a preform arranged on the mold, and a pneumatic connection means connected to the compacting device to force the membrane to exert a compacting force on the preform.

12 Claims, 9 Drawing Sheets

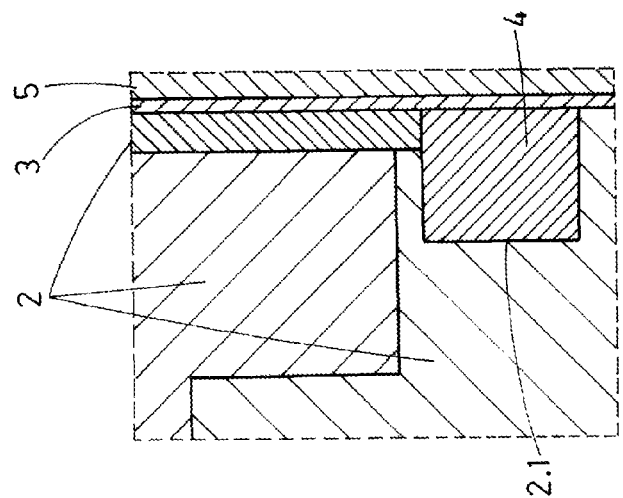
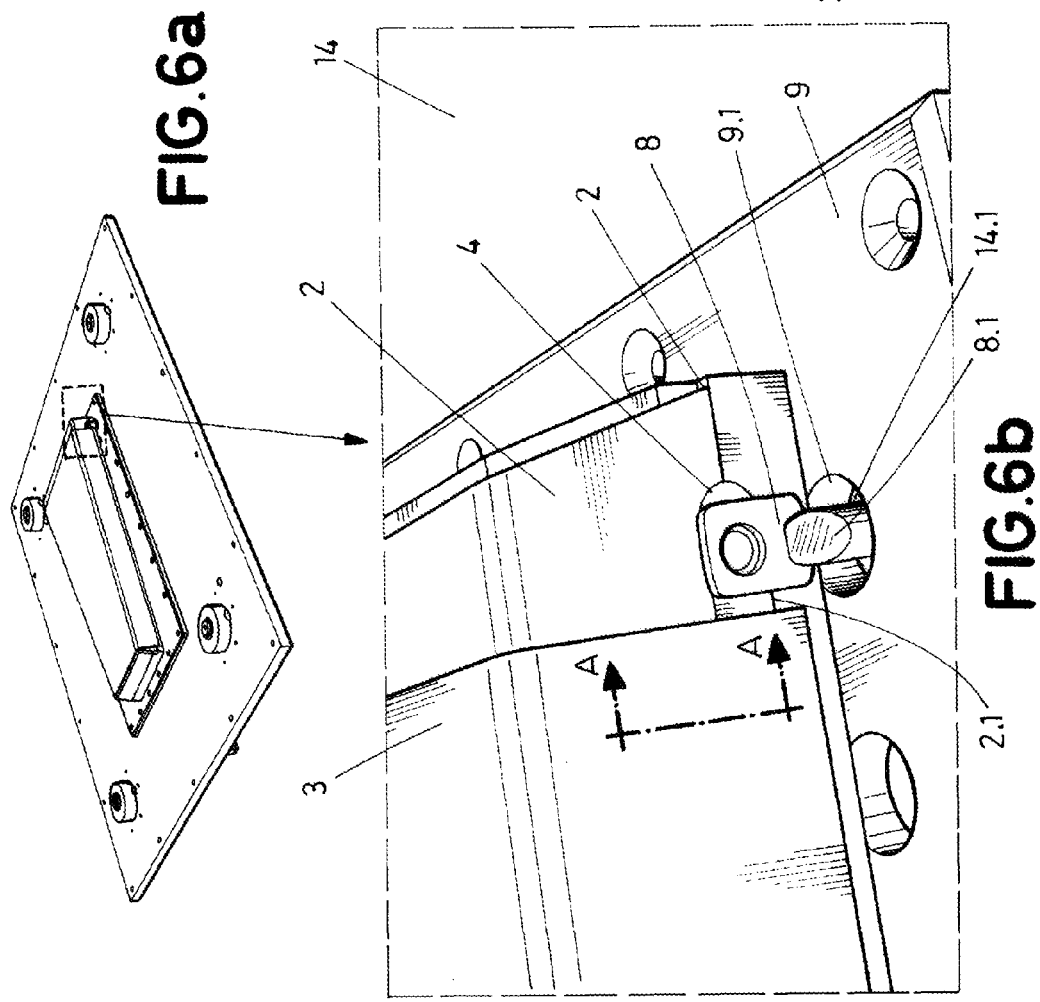

DEVICE FOR THE PREPARATION OF PREFORMS OF CARBON FIBER-REINFORCED COMPONENTS

TECHNICAL FIELD OF THE INVENTION

The present invention is comprised in the technical field of equipment for the automated manufacture of carbon fiber-reinforced composite components, and particularly of three-dimensional preforms for such components.

BACKGROUND OF THE INVENTION

The components based on carbon fiber-reinforced composites are used in different technical areas and commercial sectors, such as the aeronautical and space area, and they are now starting to be used in those applications with important requirements that combine low weight and high mechanical strength, such as some applications in the automotive industry, marine and defense applications, and recreational applications such as bicycles, golf, tennis rackets, and masts.

Carbon fibers in a fabric can be unidirectionally or multi-directionally arranged. There are different ways to combine polymer resin with the dry carbon fiber for the purpose of forming the final composite part, differentiated either by the type of applying force to perform the molding or by the form of applying the heat to activate the resin.

In the case of the composite parts with carbon fiber, prefabricated sheets (prepregs) have typically been used which combine fiber and resin (together with their curing agents) in a sheet manufactured under controlled conditions. These prepregs are subsequently laminated on the mold of the component and are generally cured by means of applying heat and pressure, mainly in an autoclave. The prepregs must be stored in controlled ambient conditions, their use being valid only during a determined storage time.

Due to the high production costs of composite parts using autoclave processes, new manufacturing methods are being developed based on resin injection. These processes do not require such strict storage conditions for the material like those of prepregs in the case of autoclave processes. In these cases, the fiber, which is either dry or slightly mixed with non-activated resin (binder), is manually laminated on the mold with the shape of the composite component. This intermediate element, prior to the final molding of the component, is called a preform. After this step, the mold is closed and the resin is introduced, activating it, for example, by means of applying heat. The resin can be introduced in the mold either by means of vacuum (infusion) or by means of using positive pressure (injection). Like any manual process, it is subjected to possible geometry or composition variations between the different manufactured preforms due to human intervention, which does not assure complete uniformity in the work.

To avoid manual processes, different devices have been designed which allow working in three dimensions ("3D") using flexible membranes in the preform compacting stage. Such devices are described, for example, in patent applications US-20100007065-A1, JP-2007118598-A, JP-2008230020-A and EP-1808282-A1. Some of the devices described in these documents also allow activating the binder during compaction, but they do so by conventional means, such as by conduction by means of resistors in the mold, by radiation by means of infrared lamps, by convection by means of hot air circulation, etc., which slow the heating process.

With respect to the activation of the binder, binder activation processes by means of resistive heating are known which are based on increasing the temperature by circulating electric current through the carbon fibers, electrical conductors, of the preform.

Thus, patent application WO-01/92002-A2 describes a carbon fiber processing cell where one of the possible preforming technologies which is considered is resistive heating. Patent application WO-03/078141-A1 relates to the processing of thermoplastic composites (not preforms) using resistive heating. Patent application US-20050236098-A1 also considers resistive heating for the material, in this case the resistive circuit being located in the mold. Finally, patent application US-2005140064-A1 describes the manufacture of preforms by means of resistive heating in general. None of these documents refers to how to compact, or how to get the electrodes used for the resistive heating to apply sufficient pressure against the carbon fiber fabric of a preform so that the electrical contact is established without variations that may generate irregularities in the curing and consequently in the final properties of the preform. In the same manner none of these documents is based on using flexible membranes to compact the preform.

DESCRIPTION OF THE INVENTION

The object of the present invention is to overcome the drawbacks of the state of the art described above by means of a device for the preparation of preforms of carbon fiber-reinforced components comprising a preforming mold that can be immobilized on a work bench; a leak-tight compacting membrane with high elongation that is elastically deformable due to the action of a pneumatic force, such that it is capable of adapting to the outer geometry of a preform arranged on the mold; a compacting device with a fixing frame in which the membrane is assembled and which can be coupled to a lifting device through a coupling system to shift the compacting device between a withdrawn position and a compacting position in which the membrane is superimposed on the preform arranged on the mold; pneumatic connection means connectable to a pneumatic system and connected to the compacting device to generate a pneumatic force on the membrane in said compacting position, forcing the membrane to adapt to said outer geometry exerting the compacting force on the preform; an anchoring system to anchor the compacting device to the work bench when the membrane is in the compacting position; and a heating system to activate a binder present in the preform by means of heating; wherein the heating system is a resistive heating system comprising at least two electrodes connectable to an electric power supply and assembled in the mold in positions in which, at least when the membrane exerts said pneumatic force on the preform, they contact opposite end areas of the preform to generate a resistive electrical circuit through the carbon fibers of the preform and to thus heat said binder to its activation temperature;

at least the parts of the mold which are in contact with the preform and with the electrodes are made of an electrically insulating material;

the mold is electrically insulated from the work bench.

The device according to the present invention allows preparing preforms of components manufactured in materials that are completely or partially reinforced with carbon fibers by means of a compacting method which combines activating the binder present in the carbon fabrics or externally applied on the sheet by means of resistive heating based on circulating an electric current through the carbon fibers, together with the simultaneous application of compacting pressure or vacuum on the preform by means of a flexible membrane.

Therefore, on one hand resistive heating has the advantage of applying the heat directly on the carbon preform, without losses due to convection or radiation which occur in other types of heating in which the heat sources are farther away than in the device described in this patent. On the other hand, by improving the homogeneity of the compacting pressure due to the uniform compacting force exerted by the membrane, better transmission of the electric current between layers of carbon, and between these layers and the electrodes, is achieved. Therefore, the combination of these processes improves the contact of the carbon fibers with the electrodes located in the preforming mold, such that a more direct, faster and more homogenous manner of activating the binder, in addition to a simple manner of fixing the electrodes without additional elements, such as complementary anchoring elements, for example, are obtained. This technical solution for preparing preforms allows automating the preforming process with the simple addition a carbon fiber fabric manipulation module.

The flexible membrane also allows compacting a wide range of preform geometries with a lower added cost for each variant due to the fact that the membrane itself acts as a counter-mold in all cases. Each 3D geometry only requires the manufacture of its preforming mold, without the need to manufacture any other counter-mold. A preforming method which can adapt in a simple manner to geometries of different sizes (scalable) and different shapes is thus obtained because it can easily go from 2D geometries to more complex 3D geometries of the preforming mold.

The electrodes, which can be made of copper, are preferably assembled in respective axial cavities in opposite positions and they further have outer surfaces adapted to the outer geometry of the mold. Each of the electrodes can be fitted to the mold, without the need for external connection means, because the fixing of the electrodes to the mold during the compacting process is assured by means of the pressure the flexible membrane exerts on them. The contact of the carbon fibers with the electrodes located in the preforming mold is thereby improved such that a faster, more controlled, repetitive and homogenous manner of activating the binder and compacting the preform is obtained. The resistive electrical circuit generated by the electrodes can be a direct current circuit.

The fact that the preforming mold is electrically insulated from the work bench prevents the circulation of electric current through elements other than the preforms comprising carbon fiber. This electrical insulation can be achieved by manufacturing the entire mold, or at least the parts of the mold which are in contact with the preform and, preferably, also those which are in contact with the work bench, from an electrically insulating material. The mold must also be made of materials with a certain resistance against the activation temperature of the binder present in the preform. To assure that there is no electric flux between the mold and the work bench, the device can also comprise an interposed electrically insulating plate assembled between the mold and the work bench. The work bench is thus insulated from the possible contact of elements through which electric current circulates. The insulating plate and the work bench can be provided with holes allowing the passage of the electrical connections from the electrodes of the mold to the lower part of the bench where the electric power supply can be located.

The heating system can include, in addition to the electrodes, electrical connections and a programmable power supply. Outside the area corresponding to the carbon preform, each electrode incorporates the element for the connection to each of the respective electric cables closing the circuit of the resistive heating system, whereby heat is transmitted directly on the carbon preform, so fewer heat losses occur in the binder activation process.

According to the invention, the mold can comprise at least one housing to house a thermocouple which records and controls the temperature during the preform binder activation. These thermocouples record and control the temperature during the binder activation process, such that the preform heating and cooling times are controlled.

The device according to the present invention can be designed to be capable of working both with positive or negative (vacuum) compacting pressure because the flexible membrane is capable of working with positive and negative pressure. This makes this device very versatile for working with a wide range of materials and geometries.

Therefore, in a preferred embodiment of the compacting device, the latter is a hood comprising an inner, leak-tight pneumatic chamber demarcated on one of its sides by the membrane assembled in the fixing frame, and at least one compressed gas connection to generate positive pressure in the pneumatic chamber in said compacting position, forcing the membrane to exert said compacting force on the preform, such that the preform is pressed against said electrodes. According to this preferred embodiment, the hood can further be provided with at least one vacuum connection to generate negative pressure in the pneumatic chamber, forcing the membrane to adopt a withdrawn position in the pneumatic chamber in which the membrane does not contact the preform when the hood is superimposed on the preform, thus preventing an early contact of the membrane from displacing the preform arranged in the preforming mold.

Different safety elements can further be integrated in the compacting hood, such as, for example, a safety valve for over-pressure inside the chamber, cut-off valve with air exhaust, detector to detect the closed position of the anchors of the hood, grounded conductive components of the device.

The lifting device can be, for example, a column with vertical linear movement which allows the upward and downward movement of the hood during the preform compacting process. The coupling system whereby the lifting device is coupled to the hood can be, for example, a fixing plate assembled or integrated in the upper part of the compacting hood.

In another alternative embodiment of the compacting device, the fixing frame in which the membrane is assembled can be coupled in a hermetically sealed manner on the work bench to form in said compacting position a leak-tight gap between the membrane, the fixing frame and the work bench, and the pneumatic connection system comprises at least one vacuum connection connectable to a suction system and connected to said leak-tight gap to generate negative pressure in said leak-tight gap, forcing the membrane to exert the compacting force on the preform. According to this alternative embodiment, the vacuum connection can be integrated in the fixing frame and/or in the work bench.

The anchoring system can comprise a plurality of pneumatic anchoring elements each comprising a female anchor assembled in the work bench and a male anchor, insertable in the female anchor, assembled in the compacting device on the periphery of the fixing frame. These pneumatic anchoring elements for anchoring to the work bench must be able to withstand the significant vertical loads generated upon pressurizing the hood.

According to what can be inferred from the foregoing description, the present solution allows automating the compacting stage and generating a permanent geometry in the preform, prior to the molding process with the resin, and reducing the manufacturing cycle times of the preforming mold, which allows acting on 3D geometries and expediting and improving the performance of the binder activation process, which binder can be present in the preform in by weight percentages of the order of 2 to 5%, taking advantage of the synergies between the functions of the flexible membrane with high elongation and the resistive heating that are claimed in the present application.

BRIEF DESCRIPTION OF THE DRAWINGS

Aspects and embodiments of the invention are described below based on schematic drawings in which

FIG. 2b is a side perspective view of the embodiment of the compacting hood, corresponding mold and work bench shown in FIG. 2a;

FIG. 6a is a front perspective view corresponding to FIG. 3;

FIG. 6b is a partial enlarged view of the part of the device marked with a circle in FIG. 6a;

FIG. 6c is a partial section view along line A-A shown in FIG. 6b, and further showing the corresponding section of the compacting membrane placed on the mold;

FIG. 8b is a perspective view showing the parts of the anchoring element shown in FIG. 8a;

Figure 1:
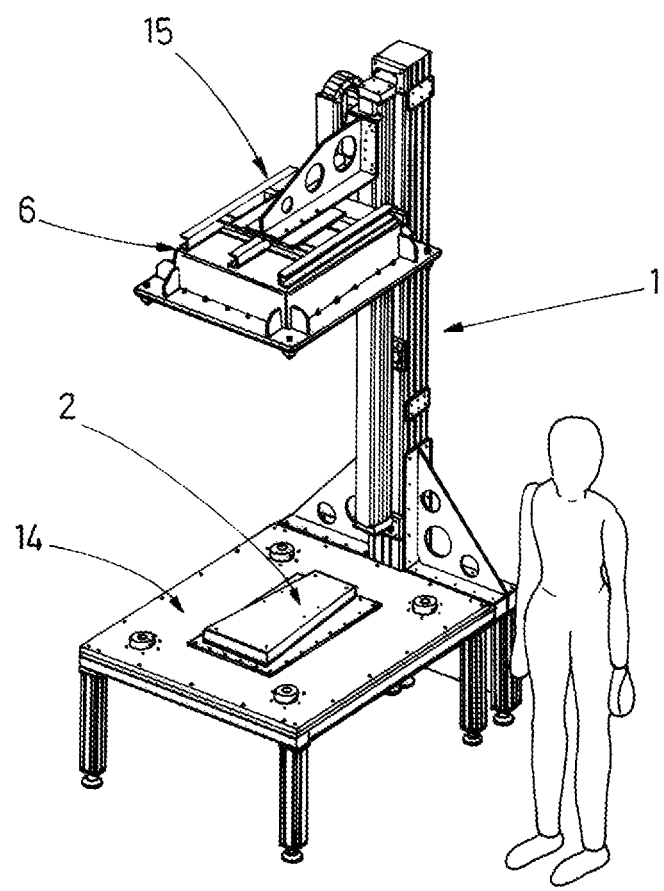
FIG. 1 is a perspective view of an embodiment of the device according to the present invention.
Figure 2A:
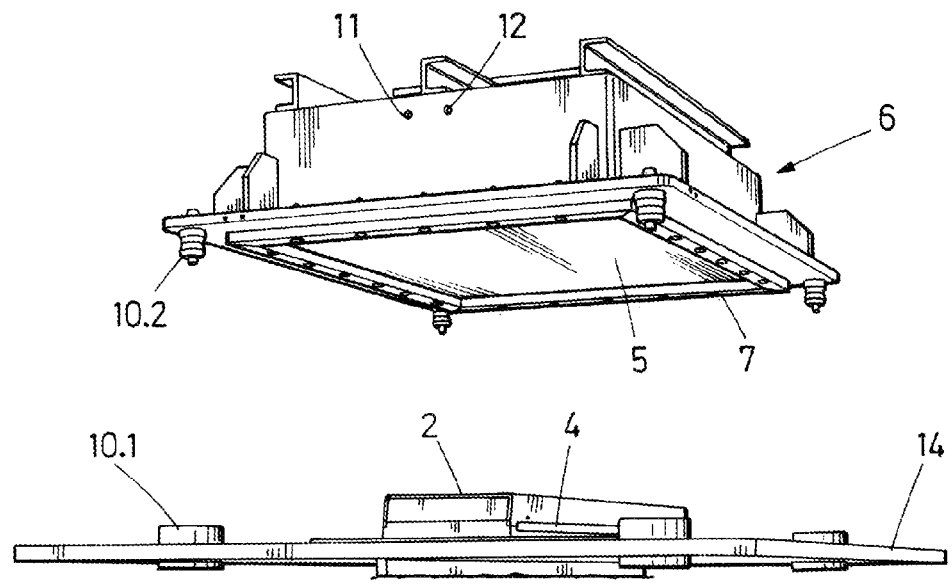
FIG. 2a is a front perspective view of an embodiment of a compacting hood, of the corresponding mold and of the work bench, according to the present invention.
Figure 2B:
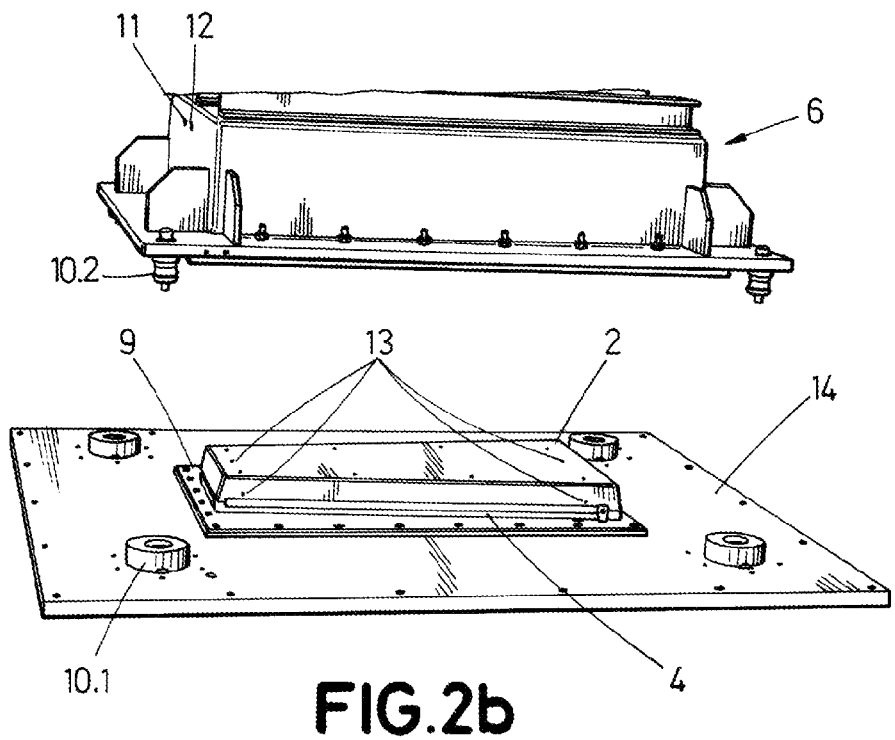
Figure 3:
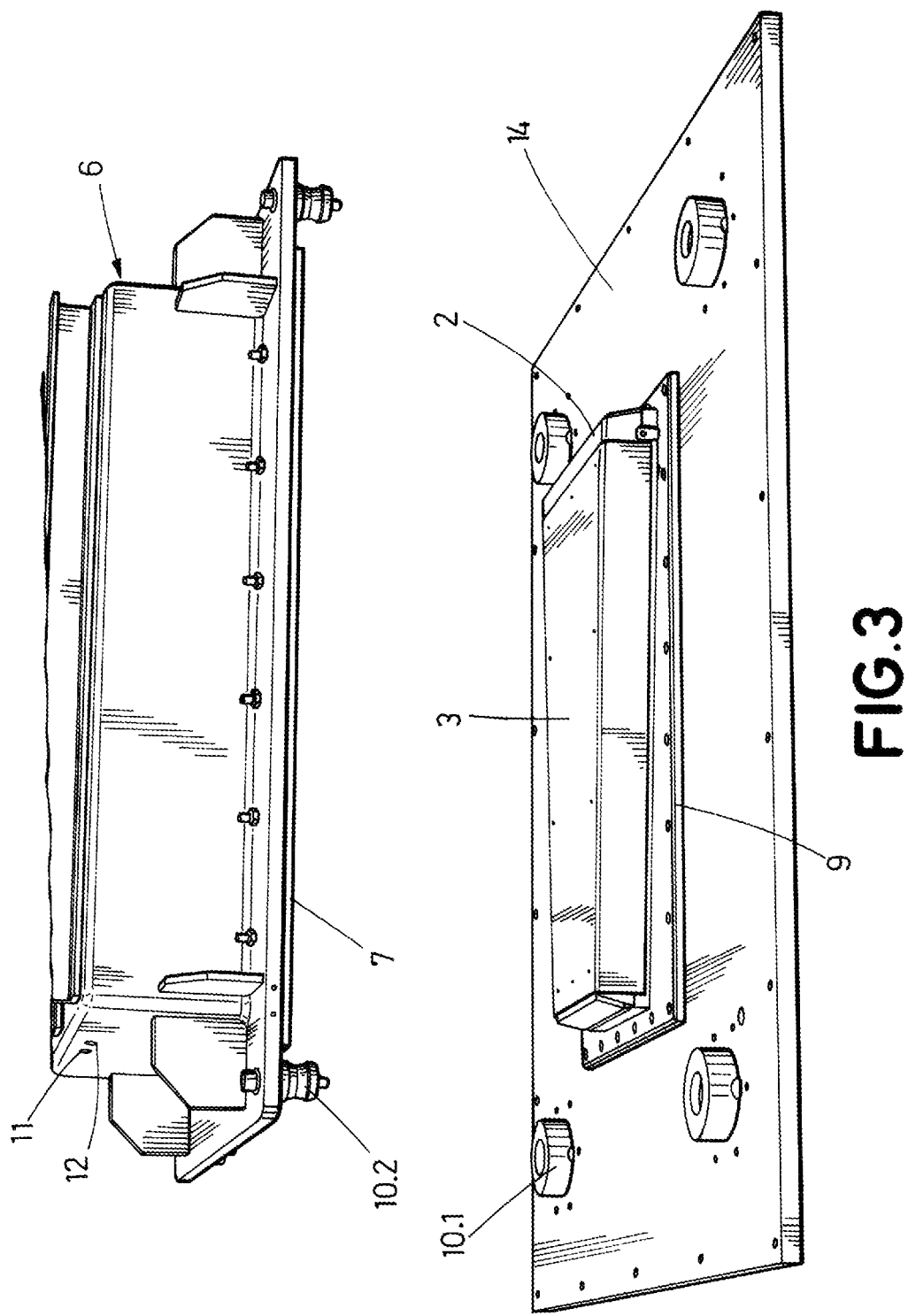
FIG. 3 is a view corresponding to FIG. 2b, but also showing the non-compacted preform placed on the mold.
Figure 4A:
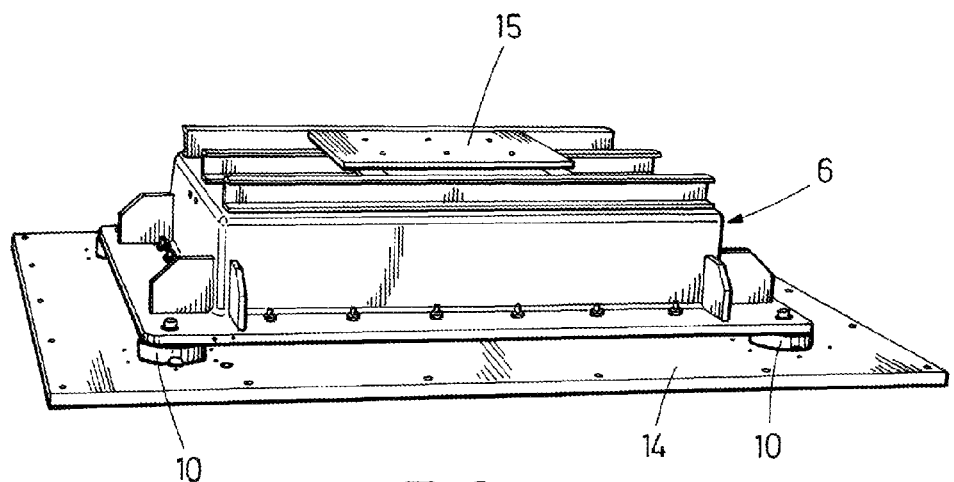
FIG. 4a is a side perspective view of the compacting hood of the previous figures in its working position on the mold arranged in the work bench.
Figure 4B:
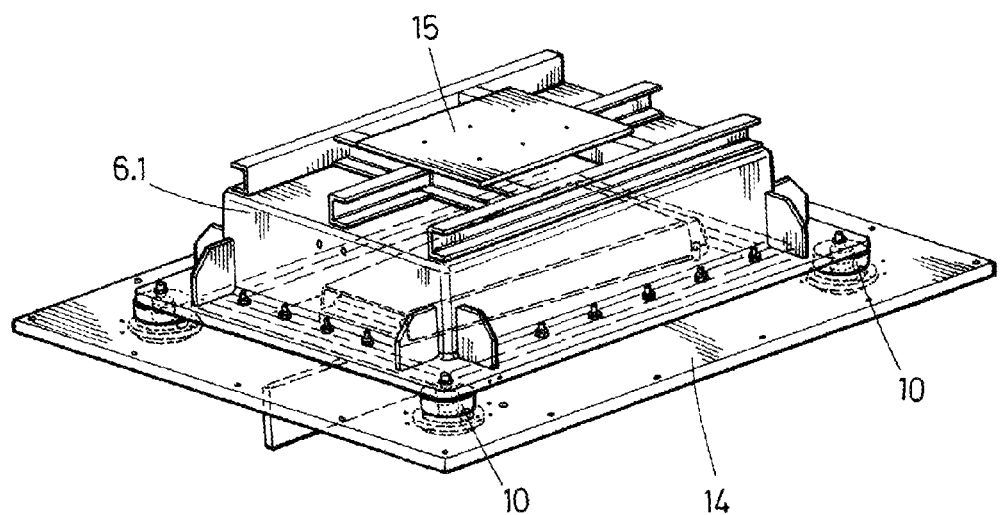
FIG. 4b is a front perspective view corresponding to FIG. 4a, but also showing the inside of the hood and the membrane.
Figure 5:
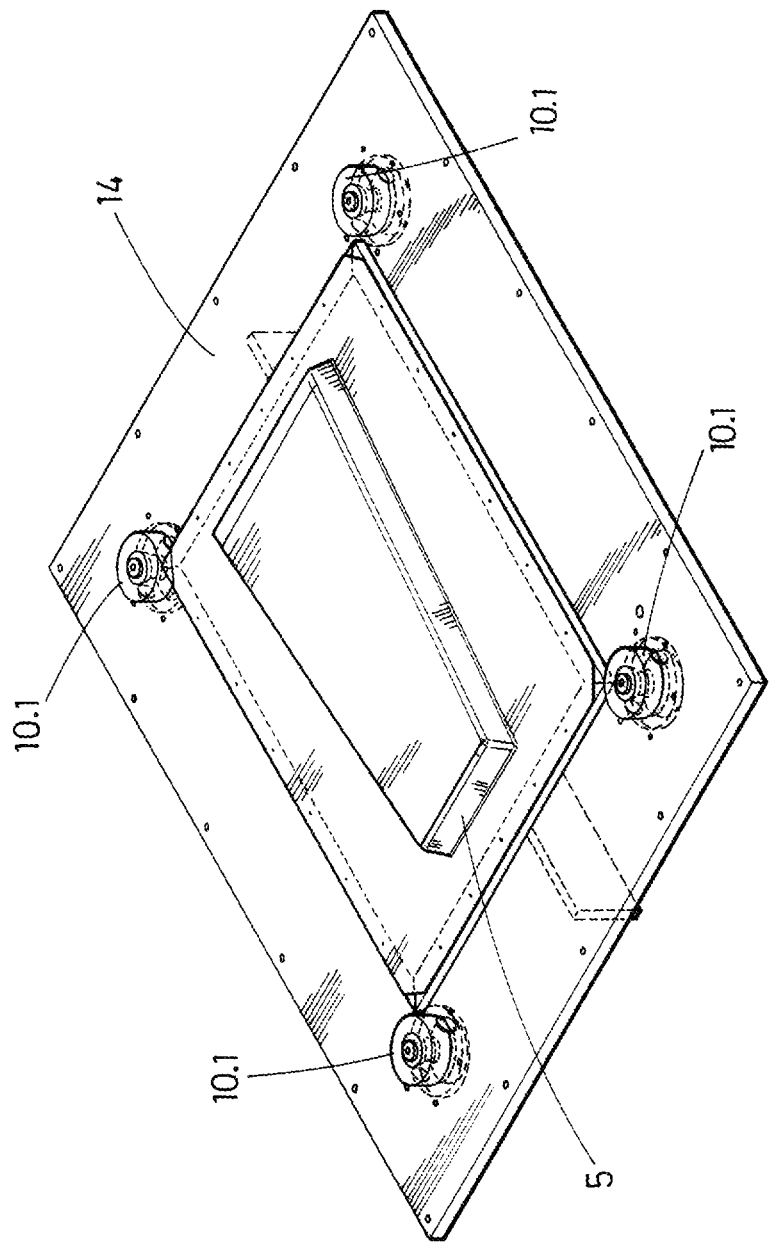
FIG. 5 is a front-upper perspective view of the membrane of the compacting hood in its working position on the mold.
Figure 7:
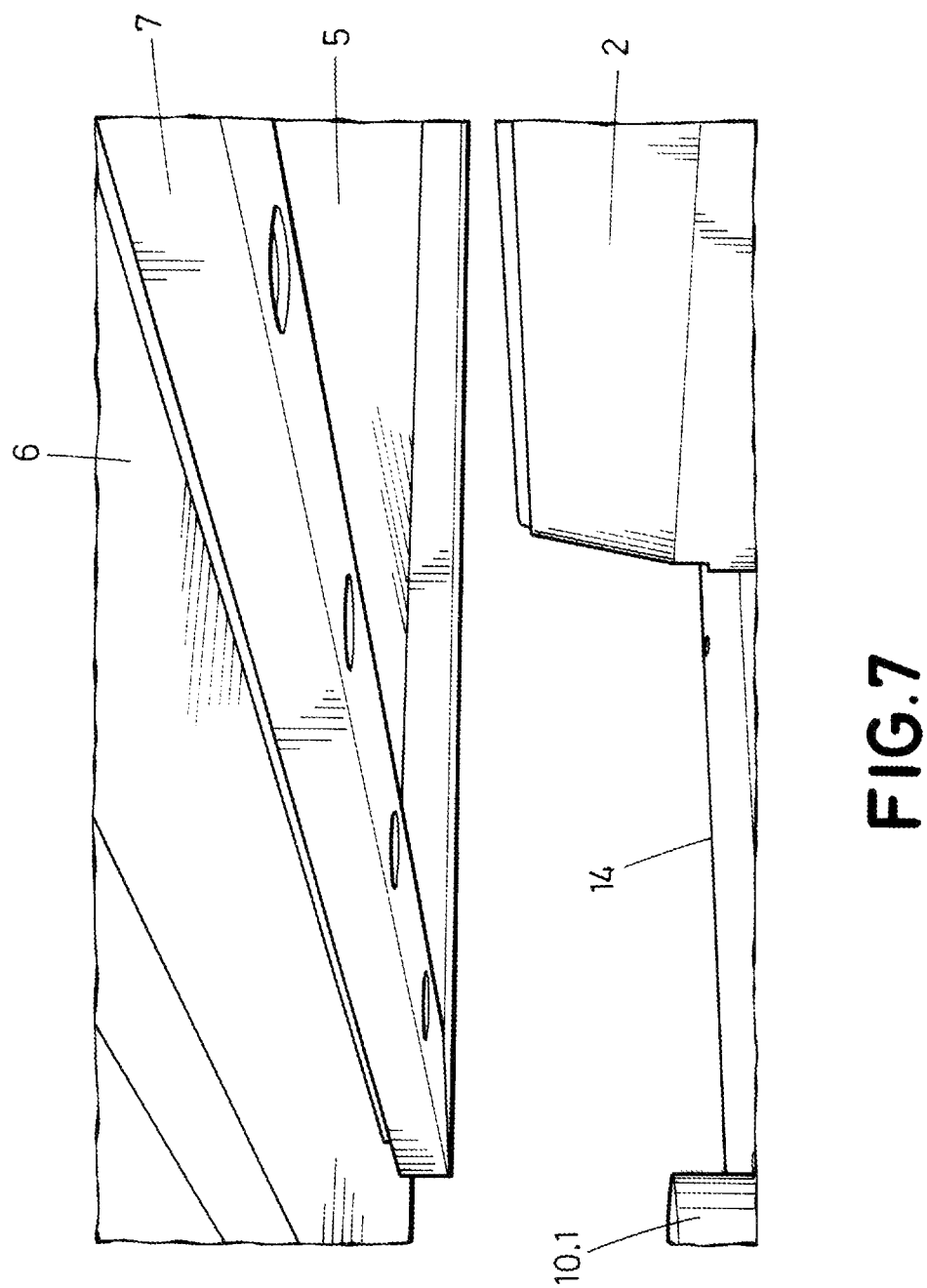
FIG. 7 is a partial perspective view of the compacting hood approaching its working position on the mold.
Figure 8A:
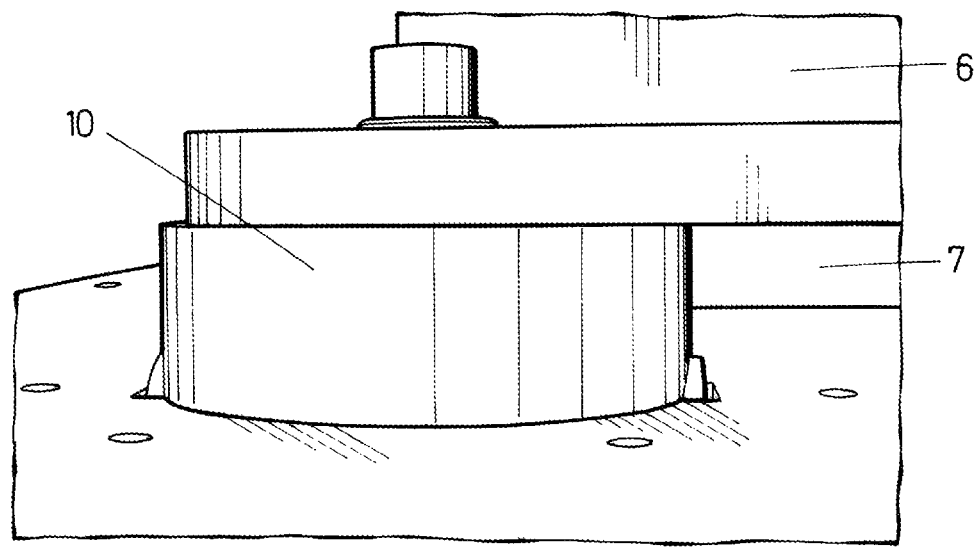
FIG. 8a is a view of an embodiment of one of the pneumatic anchoring elements serving to assure the position of the compacting hood in its working position.
Figure 8B:
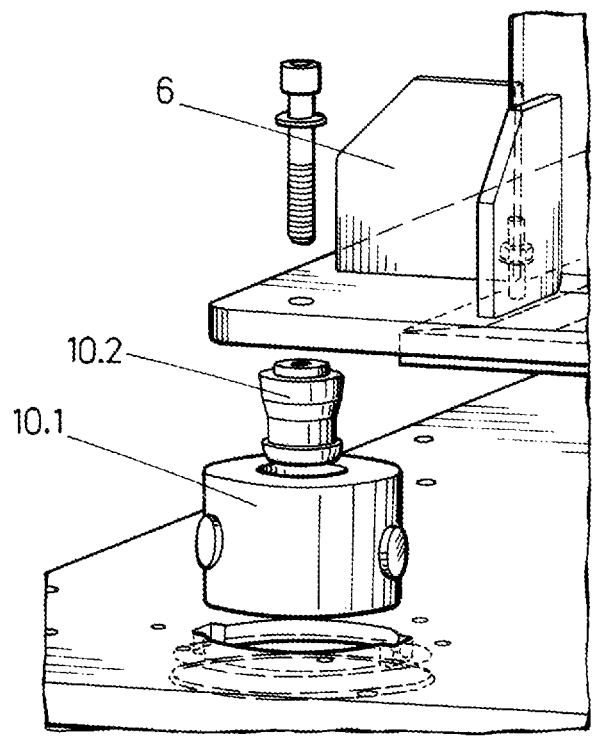
Figure 9:
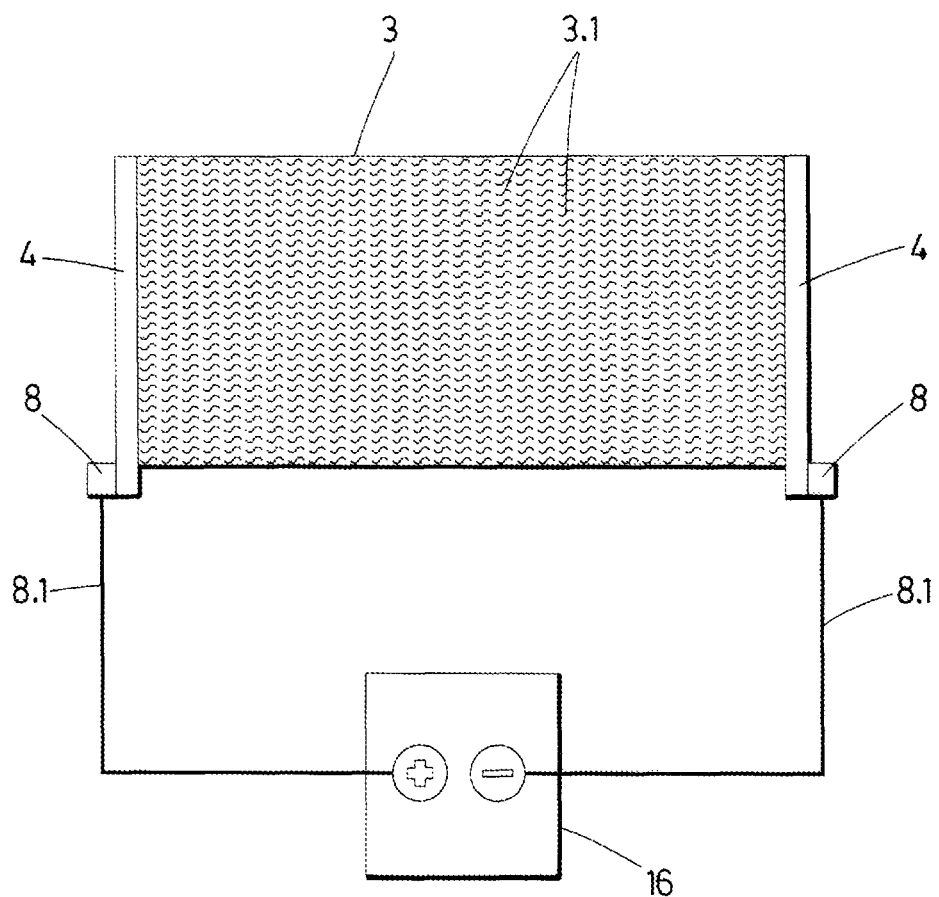
FIG. 9 is a circuit diagram of the resistive heating system.

These figures show reference numbers identifying the following elements

1 Pneumatic column
2 Mold
2.1 Axial groove
3 Carbon fiber preform
3.1 Carbon fibers
4 Copper electrodes
5 Compacting membrane with high elongation
6 Compacting hood
6.1 Pneumatic chamber
7 Membrane fixing frame
8 Electric terminal
8.1 Connecting cable
9 Insulating plate
9.1 Hole.
10 Pneumatic anchors of the hood
10.1 Female anchor
10.2 Male anchor
11 Compressed air connection of the hood
12 Vacuum point connection of the hood
13 Channels for thermocouples
14 Work bench
14.1 Hole
15 Fixing system for fixing the hood to the compacting column
16 Programmable electric power supply

EMBODIMENTS OF THE INVENTION

In the embodiment of the device according to the invention shown in the figures, this device comprises a compacting hood -6- coupled to a pneumatic column -1- by means of a fixing system -15- comprising a plate integrated in the upper part of the hood -6- and a fixing bracket coupled to the pneumatic column -1-. It is possible to move the hood -6- up and down by means of operating the pneumatic column -1-. The hood is vertically aligned with a preforming mold -2- assembled on a work bench -14-. The pneumatic column -1- can thus shift the hood -6- between an upper withdrawn position and a lower compacting position in which the membrane -5- is superimposed on the preform -3- arranged on the mold -2- and anchored to the work bench -14- by means of an anchoring system -10- which immobilizes the hood -6- on the work bench -14- when the membrane -5- is in the compacting position.

The lower part of the hood -6- comprises a fixing frame -7- in which a compacting membrane -5- is assembled. This membrane -5- is leak-tight and made of a material with high elongation that is elastically deformable due to the action of a pneumatic force, such that it is capable of adapting to the outer geometry of a preform -3- containing a fabric comprising carbon fibers 3.1- and a binder, arranged on the mold -2- and demarcates in the lower portion an inner, leak-tight pneumatic chamber -6.1- of the hood -6-.

A compressed air connection -11- and a vacuum connection -12-, connectable to a pneumatic system not shown in the drawings, such as for example an air injection pump connected to the compressed air connection -11- and a vacuum pump connected to the vacuum connection -12-, with their respective conduits and pressure regulators, are provided in the front part of the hood -6-.

The compressed air connection -11- allows injecting air into the pneumatic chamber until generating over-pressure in the pneumatic chamber -6.1- exerting a pneumatic force on the membrane -5- in the compacting position, in turn forcing the latter to adapt to the outer geometry of the mold -2- in which the preform -3- is arranged and exert a compacting force on the preform -3- by pressing it against the mold -2-. The vacuum connection -12- in turn allows generating negative pressure in the pneumatic chamber -6.1-, forcing the membrane -5- to adopt a withdrawn position in the pneumatic chamber -6.1-, in which the membrane -5- does not contact the preform -3- when the hood -6- is superimposed on the preform -3-.

Other elements, such as a safety valve due to over-pressure inside the chamber -6.1-, a cut-off valve with air exhaust, a detector to detect the closed position of the anchors of the hood -6-, are also integrated in the hood -6-.

The anchoring system -10- comprises a plurality of pneumatic anchoring elements -10-, each comprising a female anchor -10.1- assembled in the work bench -14- and a male anchor -10.2-, insertable in the female anchor -10.1-, assembled in the compacting device on the periphery of the fixing frame -7-.

The mold -2- is electrically insulated from the work bench -14- for which purpose, an electrically insulating plate -9- which insulates the work bench -14- from the possible contact of elements through which the electric current circulates, such as the electrodes -4-, the carbon fiber fabrics -3- or the electric cables -8-, is assembled between the mold -2- and the work bench -14-. The insulating plate -9- must be resistant to the temperatures generated in the binder activation process, such as temperatures up to of 100° C. for example.

In the lower parts of its longitudinal sides, the mold -2- comprises respective axial cavities -2.1- in which respective copper electrodes -4- adapted to the outer geometry of the mold -2- are fitted, without the need for external coupling means. The electrodes -4- are connected by means of respective electric terminals -8- and cables -8.1- to a programmable direct current electric power supply -16- and they are assembled in the mold -2- in positions in which, at least when the membrane -5- exerts said pneumatic force on the preform -3-, they contact opposite end areas of the preform -3- to generate a resistive electrical circuit through the carbon fibers -3.1- present in the preform -3- and to thus heat the binder present in the preform -3- to its activation temperature. The pressure exerted by the membrane -5- on the preform -3- in turn makes the preform -3- firmly press against the electrodes -4-, thus assuring optimal electrical contact with the preform. In addition to allowing compacting the 3D geometry of the preform, the membrane -5- thus assures the contact of the fabric -3- with the electrodes -4-, improving the contact resistance between them. The higher the compacting pressure, the better the transmission of the current between layers of carbon and between the carbon and the electrodes.

The mold -2- is made of an electrically insulating material so that the electric current only flows from one electrode to another through the carbon fibers -3.1- present in the preform -3-. The material of the mold -2- is also capable of withstanding the temperature conditions required for binder activation, such as temperatures between 40 and 100° C., for example.

The insulating plate -9- and the work bench -14- can be provided with respective holes -9.1, 14.1- allowing the passage of the electric cables -8.1- from the electrodes -4- of the mold -2- to the lower part of the bench -14- where the electric power supply -16- can be located.

On the other hand, the mold -2- comprises a plurality of housings -13- to house respective thermocouples, not shown in the drawings, which record and control the temperature during the preform binder activation.

The pneumatic system and the electric supply system are controlled by conventional programmable control means not shown in the drawings.

The compacting method which can be employed using the device described above comprises the steps described below.

Once the carbon fiber fabrics making up the preform -3- have been placed on the preforming mold -2-, the pneumatic column -1- is operated to make the hood -6- move downwards to the work bench -14-. The vacuum means connected to the vacuum connection -12- are operated during the downward movement to create a vacuum in the pneumatic chamber -6.1-, forcing the flexible membrane -5- to be withdrawn upwards and to be adapted to the upper part of the pneumatic chamber -6.1-. The membrane -5- is thus prevented from making early contact with the layers of carbon fiber making up the preform -3- and displacing them from their positions. The elements for securing the hood -10- to the bench are immediately operated, after which point the hood is gently pressurized until reaching the required pressure level and then the electric current is applied to heat the fabric, regulating the applied voltage so that the intensity of the current is constant. The control means record the temperature of the thermocouples arranged in the mold -2-. Once the established maximum threshold has been reached, always making sure that none of the thermocouples exceeds a maximum safety limit, the current is maintained for a pre-established time, at which point the circulation of the electric current is cut off. Finally, the hood -6- is depressurized and the assembly is lifted. Depressurization is done through an air exhaust pathway. The preform -3- is thus ready to be demolded.

As can be seen, in resistive heating the heat is applied directly on the carbon preform -3-, without the losses due to convection or radiation occurring in other less direct heating types, such as, for example, infrared, heated wires, etc. This, combined with the use of a flexible membrane -5- assuring better heat transfer between the layers of the fabric of the preform -3-, achieves obtaining a more homogenous, controlled and repetitive heating than in conventional systems. The binder is thus heated and the preform compacted in a single step, which can be referred to as "one-shot compacting".

The invention claimed is:

1. Device for the preparation of preforms of carbon fiber-reinforced components comprising
    a preforming mold (2) that can be immobilized on a work bench (14);
    a leak-tight compacting membrane (5) with high elongation that is elastically deformable due to the action of a pneumatic force, such that it is capable of adapting to the outer geometry of a preform (3) arranged on the mold (2);
    a compacting device with a fixing frame (7) in which the membrane (5) is assembled and which can be coupled to a lifting device (1) through a coupling system (15) to shift the compacting device (6) between a withdrawn position and a compacting position in which the membrane (5) is superimposed on the preform (3) arranged on the mold (2);
    pneumatic connection means connectable to a pneumatic system and connected to the compacting device to generate a pneumatic force on the membrane (5) in said compacting position, forcing the membrane (5) to adapt to said outer geometry exerting a compacting force on the preform (3);
    an anchoring system to anchor the compacting device to the work bench (14) when the membrane (3) is in the compacting position;
    a heating system to activate a binder present in the preform (3) by means of heating;
    wherein
    the heating system is a resistive heating system comprising at least two electrodes (4) connectable to an electric power supply and assembled in the mold (2) in positions in which, at least when the membrane (5) exerts said pneumatic force on the preform (3), they contact opposite end areas of the preform (3) to generate a resistive electrical circuit through the carbon fibers (3.1) of the preform (3) and to thus heat said binder to its activation temperature;
    at least the parts of the mold (2) which are in contact with the preform (3) and with the electrodes (4) are made of an electrically insulating material;
    the mold (2) is electrically insulated from the work bench (14).

2. Device according to claim 1, wherein the electrodes (4) are assembled in respective axial cavities (2.1) in opposite positions.

3. Device according to claim 1 or 2, wherein the electrodes (4) have outer surfaces adapted to the outer geometry of the mold (2).

4. Device according to claim 1, further including an electrically insulating plate (9) interposed between the mold (2) and the work bench (14).

5. Device according to claim 1, wherein the compacting device is a hood (6) comprising
- an inner, leak-tight pneumatic chamber (6.1) demarcated on one of its sides by the membrane (5) assembled in the fixing frame (7);
- at least one compressed gas connection (11) to generate positive pressure in the pneumatic chamber (6.1) in said compacting position, forcing the membrane (5) to exert said compacting force on the preform (3), such that the preform (3) is pressed against said electrodes (4).

6. Device according to claim 5, wherein the hood (6) comprises at least one vacuum connection (12) to generate negative pressure in the pneumatic chamber (6.1), forcing the membrane (5) to adopt a withdrawn position in the pneumatic chamber (6.1) in which it does not contact the preform (3) when the hood (6) is superimposed on the preform (3).

7. Device according to claim 1,
- wherein the fixing frame (7) in which the membrane (5) is assembled can be coupled in a hermetically sealed manner on the work bench (14) to form in said compacting position a leak-tight gap between the membrane (5), the fixing frame (7) and the work bench (14);
- and the pneumatic connection system further includes at least one vacuum connection (12) connectable to a suction system and connected to said leak-tight gap to generate negative pressure in said leak-tight gap, forcing the membrane (5) to exert the compacting force on the preform (3).

8. Device according to claim 7, wherein the vacuum connection (12) is integrated in the fixing frame (7).

9. Device according to claim 7, wherein the vacuum connection (12) is integrated in the work bench (14).

10. Device according to claim 1, wherein, the mold (2) includes at least one housing (13) to house a thermocouple which records and controls the temperature during the preform binder activation.

11. Device according to claim 1, wherein the anchoring system includes a plurality of pneumatic anchoring elements (10) each having a female anchor (10.1) assembled in the work bench (14) and a male anchor (10.2), insertable in the female anchor (10.1), assembled in the compacting device on the periphery of the fixing frame (7).

12. Device according to claim 1, wherein the resistive electrical circuit generated by the electrodes (4) is a direct current circuit.

* * * * *